(12) United States Patent
Song et al.

(10) Patent No.: US 11,441,277 B2
(45) Date of Patent: Sep. 13, 2022

(54) LED ACTIVE-LUMINOUS TRAFFIC MARKING BASED ON LIGHT-TRANSMITTING CONCRETE AND CONSTRUCTION METHOD THEREOF

(71) Applicant: Tongji University, Shanghai (CN)

(72) Inventors: Cancan Song, Shanghai (CN); Zhongyin Guo, Shanghai (CN); Bencheng Zhu, Shanghai (CN); Xiaoyan Hao, Shanghai (CN); Peili Wang, Shanghai (CN); Lin Lin, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/201,793

(22) Filed: Mar. 15, 2021

(65) Prior Publication Data
US 2021/0372063 A1    Dec. 2, 2021

(30) Foreign Application Priority Data
May 29, 2020    (CN) .......................... 202010475287.9

(51) Int. Cl.
*F21S 9/03*    (2006.01)
*F21V 19/00*    (2006.01)
(Continued)

(52) U.S. Cl.
CPC .......... *E01F 9/582* (2016.02); *E01C 23/0993* (2013.01); *E01F 9/512* (2016.02);
(Continued)

(58) Field of Classification Search
CPC .. F21S 8/022; F21S 8/032; F21S 8/085; E01F 9/559; E01F 9/20; E01F 11/00; E01C 17/00
See application file for complete search history.

(56) References Cited

U.S. PATENT DOCUMENTS

| | | | |
|---|---|---|---|
| 2004/0032748 A1* | 2/2004 | Trudeau ................ | F21V 33/006 362/558 |
| 2004/0184263 A1* | 9/2004 | Patti ........................ | E01C 17/00 362/145 |

(Continued)

*Primary Examiner* — William J Carter
(74) *Attorney, Agent, or Firm* — Casimir Jones SC; Lisa Mueller

(57) ABSTRACT

The present disclosure relates to an LED active luminous traffic marking based on light-transmitting concrete and a construction method thereof. The luminous traffic marking includes a light-transmitting concrete layer and a light source layer that are arranged vertically, where the light-transmitting concrete layer includes a concrete base and a plurality of light-guide fibers embedded in the concrete base, the light source layer includes an integrated LED light source board and a packaging protective shell for packaging the integrated LED light source board, the packaging protective shell is a shell with anchoring hollow protrusions, and the packaging protective shell is anchored to the concrete base through the anchoring hollow protrusions. Compared with the prior art, the present disclosure improves the visibility, digitalization and intelligence level of road traffic markings, and has a broad application prospect.

5 Claims, 3 Drawing Sheets

(51) Int. Cl.
*F21V 8/00* (2006.01)
*F21Y 115/10* (2016.01)
*E01F 9/582* (2016.01)
*E01F 9/512* (2016.01)
*E01C 23/09* (2006.01)
*F21W 111/02* (2006.01)

(52) U.S. Cl.
CPC ............ *F21S 9/037* (2013.01); *F21V 19/005* (2013.01); *G02B 6/0008* (2013.01); *F21W 2111/02* (2013.01); *F21Y 2115/10* (2016.08)

(56) References Cited

U.S. PATENT DOCUMENTS

2013/0271014 A1\* 10/2013 Dasaratha ............... E01F 9/559
   362/555
2020/0393097 A1\* 12/2020 St.Ives .................. F21V 17/107

\* cited by examiner

LED ACTIVE-LUMINOUS TRAFFIC MARKING BASED ON LIGHT-TRANSMITTING CONCRETE AND CONSTRUCTION METHOD THEREOF

TECHNICAL FIELD

The present disclosure belongs to the field of road traffic, and relates to a light emitting diode (LED) active-luminous traffic marking based on light-transmitting concrete and a construction method thereof.

BACKGROUND

Traffic markings play an important role in maintaining road order, improving traffic safety, and increasing vehicle traffic efficiency. Studies show that effectiveness of traffic markings depends on their visibility.

At present, a main method to enhance the visibility of road traffic markings is to increase their brightness. In terms of the lumination mode, traffic markings can be divided into passive and active luminous markings. Passive luminous markings achieve passive lumination by using the principle of retroreflection of light. This type of marking has been widely used, accounting for more than 99% of the total road markings. However, this type of marking wears fast, and its visibility sharply decreases in night, snow and smog environments, which significantly increases road traffic safety risks. Light-storing luminous markings, a type of active luminous marking, mainly use long afterglow materials, and work in a cycle of absorbing light, storing light, and emitting light. This type of marking has been used in rural road traffic safety signs, tunnel emergency escape systems, and urban slow walkway decoration. For example, a self-luminous traffic marking disclosed in patent CN204626284U includes a bonding layer adhered to pavement surface, the bonding layer is coated with a light storing and emitting layer, the light storing and emitting layer is coated with a light-transmitting layer, and a reflective layer is arranged on the light-transmitting layer. However, the existing light-storing luminous markings still have shortcomings such as short effective light-emitting time, excessive dependence on external light intensity, and uncontrollable brightness and color temperature.

SUMMARY

To overcome the foregoing shortcomings in the prior art, the present disclosure provides an LED active luminous traffic marking based on light-transmitting concrete and a construction method thereof, which improves the visibility, informatization and intelligence level of the traffic marking.

The objective of the present disclosure can be achieved according to the following technical solutions.

An LED active luminous traffic marking based on light-transmitting concrete includes a light-transmitting concrete layer and a light source layer that are arranged vertically, where the light-transmitting concrete layer includes a concrete base and a plurality of light-guide fibers embedded in the concrete base, the light source layer includes an integrated LED light source board and a packaging protective shell for packaging and protecting the integrated LED light source hoard, the packaging protective shell is a shell with anchoring hollow protrusions, and the packaging protective shell is anchored to the concrete base through the anchoring hollow protrusions.

Further, the luminous traffic marking may be provided as a long strip or block structure in different shapes such as a cylinder, a cube, a cuboid, a pyramid, or a truncated cone, all of which fall within the scope of the present disclosure.

Further, raw materials of the concrete base include cement, aggregate, a superplasticizer, and water.

Preferably, the raw materials of the concrete base include cement of P•O42.5 grade or above, sand with a particle size of 0.15 mm to 1.18 mm, and a superplasticizer. A mass ratio of cement to aggregate is 1:1, a water cement ratio is controlled within 0.35, and superplasticizer dosage is within 0.67% of cement mass.

Further, dosage of the light-guide fibers embedded in the concrete base is set based on drivers' visual continuity and power generation and luminance requirements of the integrated LED light source board.

Further, the light-guide fiber includes an inward light-guide fiber and an outward light-guide fiber.

Further, the outward light-guide fiber is an inclined outward light-guide fiber. From the perspective of a driver's sight height and light propagation mechanism, the inclined fiber provides higher visibility for the driver. The dosage and tilt angle of the light-guide fibers can be adjusted based on different visibility requirements.

Further, a material of the packaging protective shell may be steel, high-strength plastic, or another material with sufficient strength; its plan view size is the same as or slightly greater than the light-transmitting concrete layer; and its internal space can accommodate the entire integrated LED light source board.

Further, a quantity of the anchoring hollow protrusions corresponds to a quantity of the light-guide fibers, and when the packaging protective shell is anchored to the concrete base, the light-guide fibers pass through hollow portions of the anchoring hollow protrusions.

Further, a joint between the light-guide fiber and the anchoring hollow protrusion is provided with a sealing waterproof layer.

Further, the integrated LED light source board includes a circuit board and a solar panel, LED lamp beads, a storage battery, and control devices that are integrated on the circuit board, and positions of the solar panel and the LED lamp beads correspond to positions of the light-guide fibers. The circuit board is a carrier, and the solar panel is a power generation apparatus that converts light energy from the outside into electric energy; the storage battery is an energy storage and supply apparatus that stores surplus electric energy generated by the solar panel and supplies it to the LED lamp beads; the LED lamp bead is a light-emitting apparatus; the control device is a controller that implements different color and flashing modes of the LED lamp beads. Some electronic chips are also included, which can realize vehicle-road coordination and facilitates lane recognition and high-precision positioning of an autonomous vehicle.

Further, the LED lamp beads are monochromatic lamp beads or RGB multi-color lamp beads, to implement basic traffic safety control modes such as "red for no passing, yellow for alerting, and green for passing".

Further, when the packaging protective shell packages the integrated LED light source board, the LED lamp beads are inserted into hollow portions of the anchoring hollow protrusions.

Further, a height of the luminous traffic marking may be adjusted as required. Mechanical studies have shown that a total height (including the light-transmitting concrete layer and the light source layer) of the luminous traffic marking should be the same as a height of a specific layer (such as an upper layer, a middle layer, or a lower layer) or several layers of pavement surface.

The present disclosure further provides a construction method for the LED active luminous traffic marking based on light-transmitting concrete, which is divided into fabrication and installation of the luminous traffic marking and specifically includes the following steps:

(1) making and commissioning the integrated LED light source board to ensure that it can operate properly;

(2) packaging the integrated LED light source board in the packaging protective shell;

(3) inserting the light-guide fibers into the anchoring hollow protrusions, setting up a concrete pouring mold on the packaging protective shell, and fastening the light-guide fibers through a holed mold;

(4) pouring a cement concrete slurry into the concrete pouring mold, and after standard curing, demoulding, and continued standard curing, carrying out grinding and polishing to obtain the luminous traffic marking; and (5) embedding the luminous traffic marking into a pavement structure, and ensuring that a surface of the luminous traffic marking is flush with a road surface.

The luminous traffic marking may be arranged in a gap of an ordinary marking and used with the original marking, or may be used alone as a dot-line marking. The luminous traffic marking is suitable for cement concrete pavements and asphalt concrete pavements. For new roads, the luminous components may be pre-buried; for existing roads, the luminous components may be installed and maintained according to the steps of hole drilling, block placing, grouting, and curing and repairing.

The present disclosure has the following beneficial effects as compared with the prior art.

1. The present disclosure introduces the light-transmitting concrete layer into the field of road traffic markings, to form a new type of traffic marking, which enhances visibility of the traffic marking, and improves its informatization and intelligence level.

2. A surface of the luminous component is flush with the road surface without protruding from the road surface. This can reduce the risk of tire blowout when a vehicle presses over the luminous component, avoid causing obvious vibration of vehicles and affecting the comfort of drivers and passengers, and prevent the luminous component from being shoveled off during snow clearing.

3. For high-risk sections of highways, the present disclosure has a better effect of inducing drivers' sight line, and provides a new type of traffic safety guarantee scheme, to realize safe, smart and green transportation.

4. The present disclosure uses LED lamp heads, and control devices are correspondingly arranged to conveniently control brightness and color temperature of the LED lamp beads.

5. A solar panel and a storage battery are arranged on the integrated LED light source hoard of the present disclosure. Relying on the solar panel with higher power generation efficiency, surplus electric energy generated is stored in the storage battery. When sunlight is insufficient, the storage battery can supply energy to the light source, solving the problem of excessive dependence on external light intensity.

6. The intelligent active luminous traffic marking of the present disclosure has a broad application prospect in guaranteeing traffic safety and improving vehicle-road collaboration technology.

DETAILED DESCRIPTION

The present disclosure is described in detail below with reference to the accompanying drawings and specific embodiments. The embodiments are implemented on the premise of the technical solution of the present disclosure and provide the detailed implementations and specific operation processes, but the protection scope of the present disclosure is not limited to the following embodiments.

Figure 1:
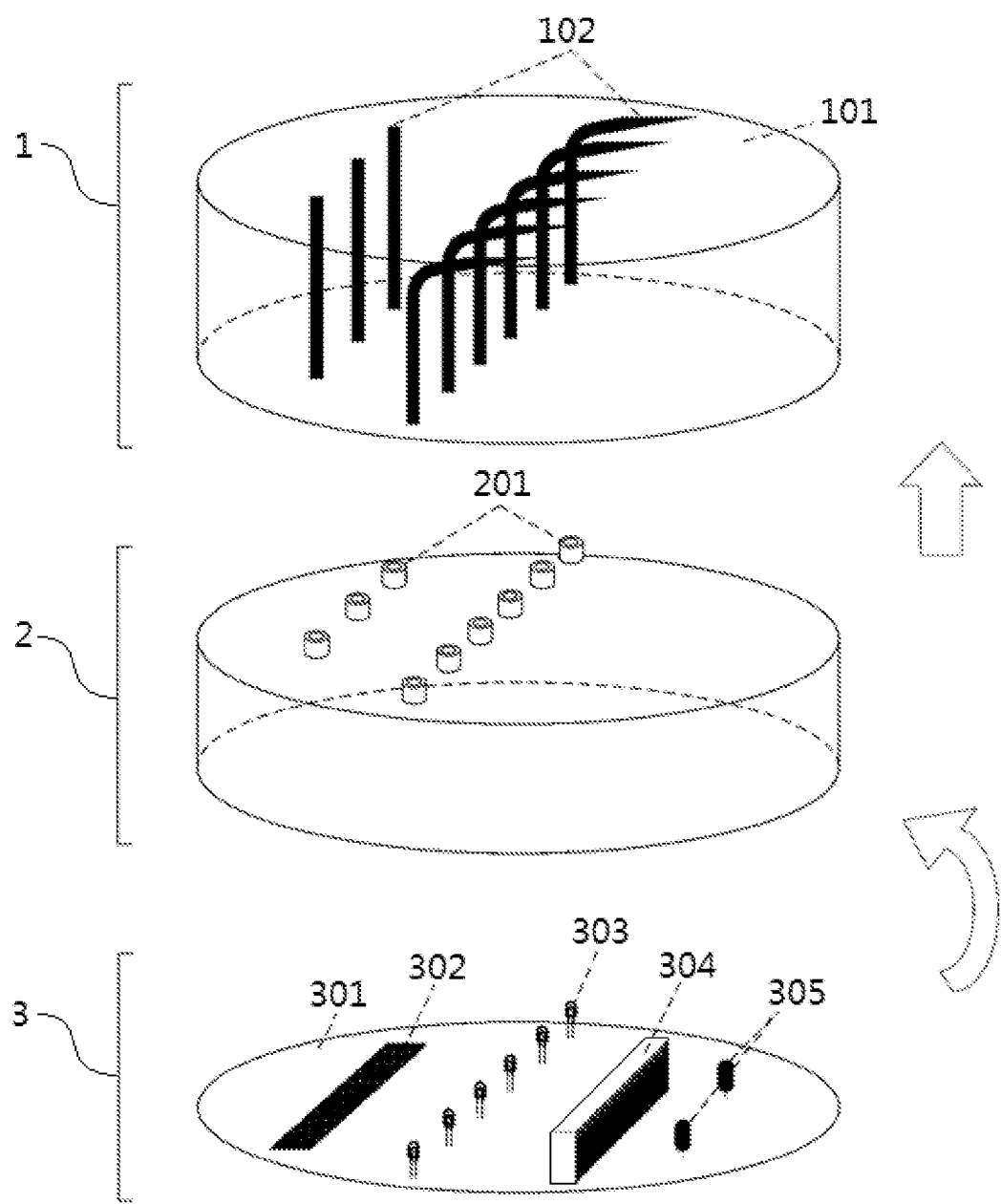
FIG. 1 is a schematic structural diagram of a traffic marking according to the present disclosure.

As shown in FIG. 1, this embodiment provides a cylindrical LED active luminous traffic marking based on light-transmitting concrete, including a light-transmitting concrete layer 1 and a light source layer that are arranged vertically. The light-transmitting concrete layer 1 includes a concrete base 101 and a plurality of light-guide fibers 102 embedded in the concrete base 101, the light source layer includes an integrated LED light source board 3 and a packaging protective shell 2 for packaging the integrated LED light source board 3, the packaging protective shell 2 is a shell with anchoring hollow protrusions 201, and the packaging protective shell 2 is anchored to the concrete base 101 through the anchoring hollow protrusions 201. The integrated LED light source board 3 includes a circuit board 301 and a solar panel 302, LED lamp beads 303, a storage battery 304, and control devices 305 that are integrated on the circuit board 301, and positions of the solar panel 302 and the LED lamp beads 303 correspond to positions of the light-guide fibers 102.

Figure 3:
FIG. 3 is a schematic diagram of a vertical light-guide fiber according to the present disclosure.
Figure 4:
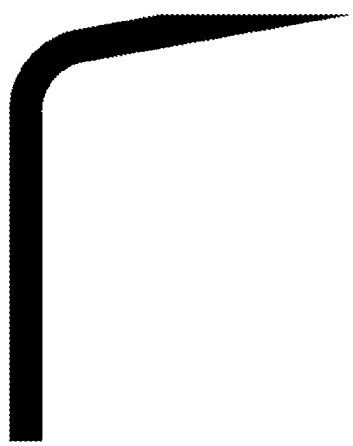
FIG. 4 is a schematic diagram of an inclined light-guide fiber according to the present disclosure.

In this embodiment, the light-guide fiber 102 includes a vertical inward light-guide fiber and an inclined outward light-guide fiber, as shown in FIG. 3 and FIG. 4. The vertical light-guide fiber guides external light from the sun, car lights, roadside lighting into the component to provide energy for the solar panel built in the component. The inclined light-guide fiber guides light generated by the built-in LED out of the component so that the traffic marking can be visually recognized by drivers. A dosage and a tilt angle of the inclined light-guide fibers may be set as required. Table 1 shows fiber dosage under different design speed conditions, which is determined from the perspective of cost-effectiveness and visibility.

TABLE 1

| Fiber dosage under different design speed conditions | | | | |
| --- | --- | --- | --- | --- |
| Design speed/km · h − 1 | 120 | 100 | 80 | 60 |
| Fiber dosage/pcs | 6 | 4 | 3 | 2 |

Figure 2:
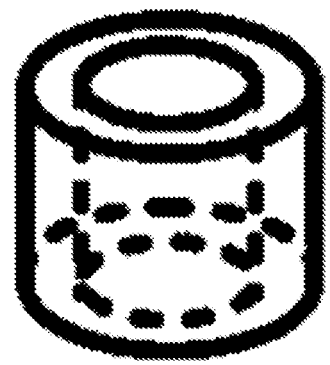
FIG. 2 is a schematic diagram of an anchoring hollow protrusion according to the present disclosure.

In this embodiment, a structure of the anchoring hollow protrusion 201 is shown in FIG. 2. The light-guide fibers 102 and the LED lamp beads 303 may be placed in hollow portions of the anchoring hollow protrusions 201.

In this embodiment, a joint between the light-guide fiber 102 and the anchoring hollow protrusion 201 is provided with a sealing waterproof layer.

In this embodiment, the LED lamp beads are monochromatic lamp beads or RGB multi-color lamp beads, to implement basic traffic safety control modes such as "red for no passing, yellow for alerting, and green for passing".

A construction method for the LED active luminous traffic marking based on light-transmitting concrete is divided into fabrication and installation of the luminous traffic marking. The fabrication of the luminous traffic marking specifically includes the following steps:

(1) Make and commission the integrated LED light source hoard: Arrange the solar power board 302, the LED lamp beads 303, the storage battery 304, and the control devices 305 on the circuit board 301 in a specific sequence, and commission and connect all the parts to ensure that they can work properly.

(2) Package the fabricated integrated LED light source board 3 into the packaging protective shell 2. During packaging, insert the LED lamp beads 303 into the anchoring hollow protrusions 201.

(3) Insert, into the anchoring hollow protrusions 201, vertical and inclined light-guide fibers that have been processed in advance based on parameters such as sizes and tilt angles, and take sealing and waterproof treatment on their joints.

(4) Set up a concrete pouring mold on an upper surface of the packaging protective shell 2, use a holed mold to fasten the light-guide fibers, slowly pour a mixed cement concrete slurry into the mold, and compact according to a standard compaction method for concrete components.

(5) Put the cast luminous concrete block in a standard curing room for 48 hours, demould it, and then continue the 28-day standard curing.

(6) Cut, grind and polish the luminous concrete component after the 28-day standard curing. Specifically, cut excess concrete and fibers from the upper surface, and carry out overall grinding and polishing, to obtain a complete LED active luminous traffic marking block based on light-transmitting concrete.

In this embodiment, a diameter of the LED lamp bead is 5 mm, a diameter of the light-guide fiber is 6 mm, a type of the light-guide fiber is PMMA plastic fiber, and fiber dosage is 9 pcs (including 3 pieces of vertical light-guide fiber and 6 pieces of inclined light-guide fiber). Further, the LED lamp heads and the fiber type and dosage may be adjusted according to actual requirements.

In this embodiment, materials of the concrete base include Conch P•O42.5 cement, river sand with a particle size of 0.15 mm to 1.18 mm, and a polycarhoxylate superplasticizer. A mass ratio of cement to aggregate is 1:1, a water cement ratio is 0.33, and superplasticizer dosage is 0.67% of cement mass. Further, the materials used in the concrete matrix and their mixing ratio may be adjusted according to actual requirements.

Figure 5:
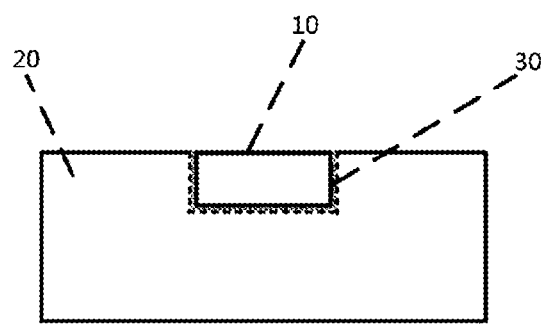
FIG. 5 is a schematic diagram of a traffic marking embedded into pavement surface according to the present disclosure.

FIG. 5 shows installation of the luminous traffic marking. The luminous traffic marking 10 is embedded in a pavement structure 20, a surface of the luminous traffic marking is flush with the road surface, and a grouting material 30 is filled between the luminous traffic marking 10 and the pavement structure 20. The luminous component is installed in the road surface in two modes: pre-buried and excavated. The pre-buried mode is suitable for new roads. The excavated mode is suitable for existing roads. The luminous component may be installed and maintained according to the steps of hole drilling, block placing, grouting, and curing and repairing.

The foregoing are detailed descriptions of the preferred specific embodiment of the present disclosure. It will be understood that a person of ordinary skill in the art can make various modifications and variations according to the concept of the present disclosure without creative efforts. Therefore, all technical solutions that a person skilled in the art can arrive at based on the prior art through logical analysis, deduction, or limited experiments according to the concept of the present disclosure shall fall within the protection scope defined by the appended claims.

What is claimed is:

1. A light emitting diode (LED) active luminous traffic marking based on light-transmitting concrete, comprising: a light-transmitting concrete layer and a light source layer that are arranged vertically, wherein the light-transmitting concrete layer comprises a concrete base and a plurality of light-guide fibers embedded in the concrete base, wherein the light-guide fiber comprises an inward light-guide fiber and an outward light-guide fiber, wherein the outward light-guide fiber is an inclined outward light-guide fiber, the light source layer comprises an integrated LED light source board and a packaging protective shell for packaging the integrated LED light source board, wherein the integrated LED light source board comprises a circuit board and a solar panel, LED lamp beads, a storage battery, and control devices that are integrated on the circuit board, and the position of the solar panel corresponds to positions of the inward light-guide fibers, and positions of the LED lamp beads correspond to positions of the outward light-guide fibers, and wherein the inward light-guide fibers guide external light to provide energy for the solar panel, and the outward light-guide fibers guide light generated by the LED lamp beads out of the LED active luminous traffic marking based on light transmitting concrete, the packaging protective shell is a shell with anchoring hollow protrusions, and the packaging protective shell is anchored to the concrete base through the anchoring hollow protrusions, wherein a quantity of the anchoring hollow protrusions corresponds to a quantity of the light-guide fibers, and when the packaging protective shell is anchored to the concrete base, the light-guide fibers pass through hollow portions of the anchoring hollow protrusions, wherein when the packaging protective shell packages the integrated LED light source board, LED lamp beads are inserted into hollow portions of the anchoring hollow protrusions.

2. The LED active luminous traffic marking based on light-transmitting concrete according to claim 1, wherein raw materials of the concrete base comprise cement, aggregate, a superplasticizer, and water.

3. The LED active luminous traffic marking based on light-transmitting concrete according to claim 1, wherein a joint between the light-guide fiber and the anchoring hollow protrusion is provided with a sealing waterproof layer.

4. The LED active luminous traffic marking based on light-transmitting concrete according to claim 1, wherein the LED lamp beads are monochromatic lamp beads or RGB multi-color lamp beads.

5. A construction method for the LED active luminous traffic marking based on light-transmitting concrete according to claim 1, comprising:

(1) making and commissioning the integrated LED light source board;

(2) packaging the integrated LED light source board in the packaging protective shell;

(3) inserting the light-guide fibers into the anchoring hollow protrusions, setting up a concrete pouring mold on the packaging protective shell, and fastening the light-guide fibers through a holed mold;
(4) pouring a cement concrete slurry into the concrete pouring mold, and after standard curing, demoulding, and continued standard curing, carrying out grinding and polishing to obtain the luminous traffic marking; and
(5) embedding the luminous traffic marking into a pavement structure, and ensuring that a surface of the luminous traffic marking is flush with a road surface.

\* \* \* \* \*